(12) United States Patent
Wang et al.

(10) Patent No.: US 10,057,929 B2
(45) Date of Patent: Aug. 21, 2018

(54) ENHANCED HOTSPOT 2.0 MANAGEMENT OBJECT FOR TRUSTED NON-3GPP ACCESS DISCOVERY

(71) Applicant: Samsung Electronics Co., Ltd., Suwon-si, Gyeonggi-do (KR)

(72) Inventors: Shu Wang, Allen, TX (US); Niranjan, The Colony, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 45 days.

(21) Appl. No.: 14/829,457

(22) Filed: Aug. 18, 2015

(65) Prior Publication Data

US 2017/0055302 A1    Feb. 23, 2017

(51) Int. Cl.
*H04W 4/00* (2018.01)
*H04W 76/02* (2009.01)
(Continued)

(52) U.S. Cl.
CPC ......... *H04W 76/022* (2013.01); *H04W 8/265* (2013.01); *H04W 12/02* (2013.01);
(Continued)

(58) Field of Classification Search
None
See application file for complete search history.

(56) References Cited

U.S. PATENT DOCUMENTS

| | | | |
|---|---|---|---|
| 2010/0195493 A1* | 8/2010 | Hedman | H04L 63/1458 370/230 |
| 2011/0216743 A1* | 9/2011 | Bachmann | H04L 63/164 370/331 |

(Continued)

FOREIGN PATENT DOCUMENTS

| | | |
|---|---|---|
| EP | 2037652 A2 | 3/2009 |
| EP | 2194686 A1 | 6/2010 |

(Continued)

OTHER PUBLICATIONS

ETSI TS 123 402 V10.3.0; "Universal Mobile Telecommunications Systems (UMTS); LTE; Architecture enhancements for non-3GPP accesses (3GPP TS 23.402 version 10.3.0"; Release 10; Mar. 2011; 229 pages.

(Continued)

*Primary Examiner* — Otis L Thompson, Jr.

(57) ABSTRACT

User equipment (UE) includes a transceiver configured to transmit and receive information to/from a Wireless Fidelity (WiFi) access point. The UE includes processing circuitry coupled to the transceiver and configured to: determine a service provider associated with the WiFi access point based on a response to an ANQP query. The UE is configured to receive at least a portion of a management object (MO). The MO includes a trust field specifying whether the WiFi access point is trusted for WiFi offload by the service provider. The UE is configured to: in response to determining that the WiFi access point is trusted, send an L3 attach trigger. The UE is configured to: in response to determining that the WiFi access point is not trusted, establish an Internet Protocol security (IPsec) tunnel that the UE to an Evolved Packet Data Gateway through the untrusted WiFi access point.

19 Claims, 9 Drawing Sheets

(51) Int. Cl.
*H04W 48/16* (2009.01)
*H04W 72/04* (2009.01)
*H04W 8/26* (2009.01)
*H04W 48/14* (2009.01)
*H04W 12/02* (2009.01)
*H04W 12/08* (2009.01)
*H04L 29/06* (2006.01)

(52) U.S. Cl.
CPC .......... *H04W 12/08* (2013.01); *H04W 48/14* (2013.01); *H04W 48/16* (2013.01); *H04W 72/0453* (2013.01); *H04L 63/0272* (2013.01); *H04L 63/164* (2013.01)

(56) References Cited

U.S. PATENT DOCUMENTS

| | | | | |
|---|---|---|---|---|
| 2013/0005332 A1* | 1/2013 | Sedlacek | ............... | H04W 12/06 455/426.1 |
| 2013/0265985 A1* | 10/2013 | Salkintzis | ............. | H04W 48/08 370/331 |
| 2014/0101726 A1* | 4/2014 | Gupta | ................ | H04N 21/2365 726/4 |
| 2014/0362691 A1* | 12/2014 | Lei | ....................... | H04W 48/18 370/230 |
| 2015/0103812 A1* | 4/2015 | Zhao | ..................... | H04W 48/16 370/338 |
| 2015/0281998 A1* | 10/2015 | Joly | ..................... | H04W 48/14 370/235 |
| 2015/0350954 A1* | 12/2015 | Faccin | ................ | H04W 76/026 370/254 |
| 2016/0337942 A1* | 11/2016 | Catovic | ................. | H04W 48/08 |

FOREIGN PATENT DOCUMENTS

| | | |
|---|---|---|
| EP | 2860999 A1 | 4/2015 |
| WO | 2010086029 A1 | 8/2010 |

OTHER PUBLICATIONS

European Patent Office, "European Search Report," Application No. 16166613.6, dated Dec. 14, 2016, 9 pages, publisher EPO, Munich, Germany.

3GPP TS 24.312 V12.9.0, "3rd Generation Partnership Project; Technical Specification Group Core Network and Terminals; Access Network Discovery and Selection Function (ANDSF) Management Object (MO)," Technical Specification, (Release 12), Jun. 26, 2015, pp. 1-375, publisher 3GPP Organizational Partners (ARIE, ATIS, CCSA, ETSI, TSDSI, TTA, TTC), Sophia Antipolis Valbonne—France.

Ericsson et al, "[Draft] LS on re-using 1-13 HS2.0 MO within ANDSF," 3GPP TSG-SA2 Meeting #97, Busan, South Korea; S2-132022, May 27, 2013, 3 pages, availablie at URL:http://www.3gpp.org/ftp/tsg_sa/WG2_Arch/TSGS2_97_Busan/Docs/.

* cited by examiner

Figure 5B: Graphical Representation of PerProviderSubscription MO Part 2

ENHANCED HOTSPOT 2.0 MANAGEMENT OBJECT FOR TRUSTED NON-3GPP ACCESS DISCOVERY

TECHNICAL FIELD

The present application relates generally to wireless communication systems, and more specifically, to Enhanced Hotspot 2.0 Management Object for Trusted Non-3GPP Access Discovery.

BACKGROUND

There various approaches for UE to estimate a trust relationship of a non-3GPP access network. Each of the various approaches has its own disadvantages. Wi-Fi Alliance (WFA) Hotspot (HS) 2.0 (release 2) standard defines a PerProviderSubscription Management Object (referred to as "Standard PPS MO"), which includes subscription and policy specific parameters.

SUMMARY

This disclosure provides an apparatus and method for an Enhanced Hotspot 2.0 Management Object for Trusted Non-3GPP Access Discovery.

In a first embodiment, an apparatus includes a transceiver configured to transmit information to and receive information from a Wireless Fidelity (WiFi) access point. The UE includes processing circuitry coupled to the transceiver and configured to: determine a service provider associated with the WiFi access point based on a response to an Access Network Query Protocol (ANQP) query. The processing circuitry is configured to receive at least a portion of a management object (MO), the MO including a trust field specifying whether the WiFi access point is trusted for WiFi offload by the service provider. The processing circuitry is configured to: in response to determining that the WiFi access point is trusted, send an L3 attach trigger. The processing circuitry is configured to: in response to determining that the WiFi access point is not trusted, establish an Internet Protocol security (IPsec) tunnel that connects the apparatus to an Evolved Packet Data Gateway (ePDG) through the untrusted WiFi access point.

In a second embodiment, an apparatus including an input/output terminal configured to output information to and receive information from a user equipment (UE) through a Wireless Fidelity (WiFi) access point. The apparatus includes processing circuitry coupled to the input/output terminal. The processing circuitry is configured to: in response to a receiving a request to an Access Network Query Protocol (ANQP) query, output a response indicating a service provider associated with the WiFi access point. The processing circuitry is configured to generate and provision to the UE at least a portion of a management object (MO). The MO includes a trust field specifying whether the WiFi access point is trusted for WiFi offload the service provider.

In a third embodiment, a method includes receiving information from a Wireless Fidelity (WiFi) access point. The method includes determining, by processing circuitry, a service provider associated with the WiFi access point based on a response to an Access Network Query Protocol (ANQP) query. The method includes receiving at least a portion of a management object (MO). The MO includes a trust field specifying whether the WiFi access point is trusted for WiFi offload by the service provider. The method includes: in response to determining that the WiFi access point is trusted, sending an L3 attach trigger. The method includes: in response to determining that the WiFi access point is not trusted, establishing an Internet Protocol security (IPsec) tunnel that connects a user equipment to an Evolved Packet Data Gateway (ePDG) through the untrusted WiFi access point.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other technical features may be readily apparent to one skilled in the art from the following figures, descriptions, and claims. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: (i) TS 23.402 3rd Generation Partnership Project, Technical Specification Group Services and System Aspects, Architecture enhancements for non-3GPP accesses (Release 10) (hereinafter "REF1"); (ii) EP 2037652 A3 Access-network to core-network trust relationship detection for a mobile node (hereinafter "REF2"); and (iii) Wi-Fi Alliance (WFA) Hotspot (HS) 2.0 (release 2) Technical Specification, 2014 (hereinafter "REF3").

Figure 1:
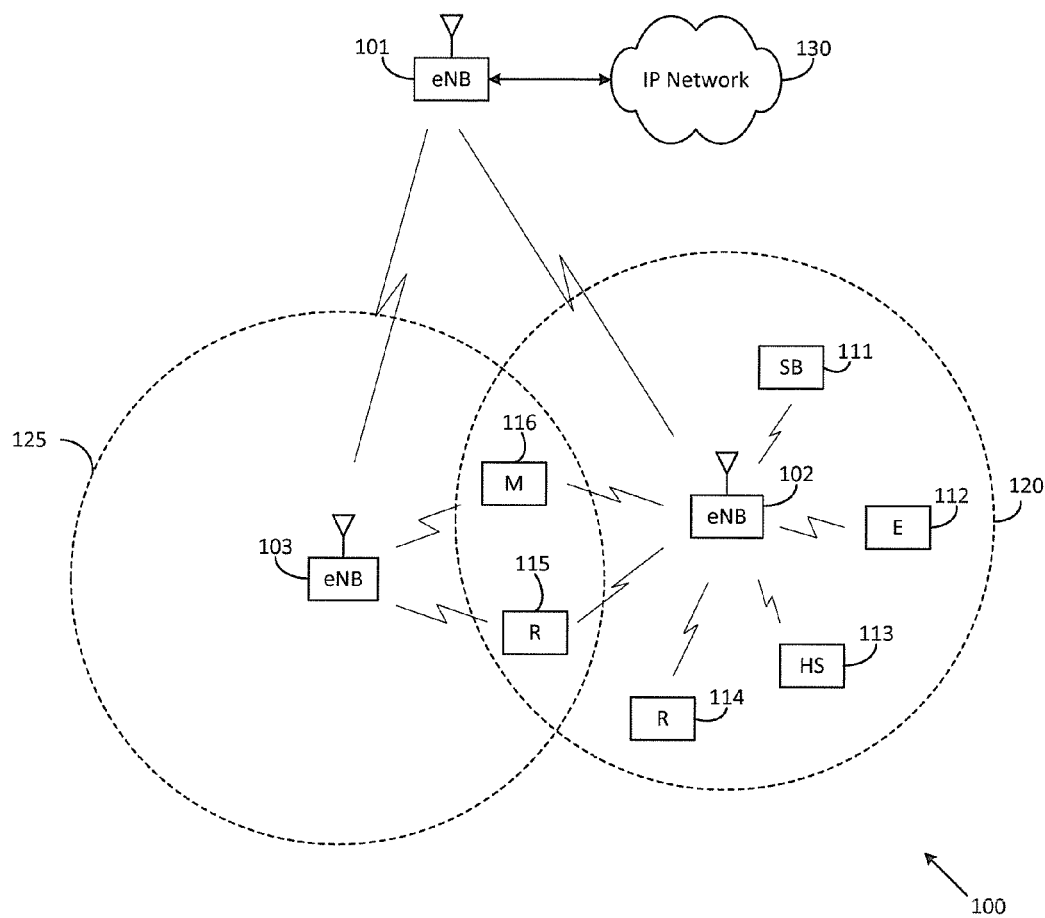
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, UEs and network nodes, such as a Subscription Remediation (Sub Rem) Server, implement methods of Enhanced Hotspot 2.0 Management Object for Trusted Non-3GPP Access Discovery.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
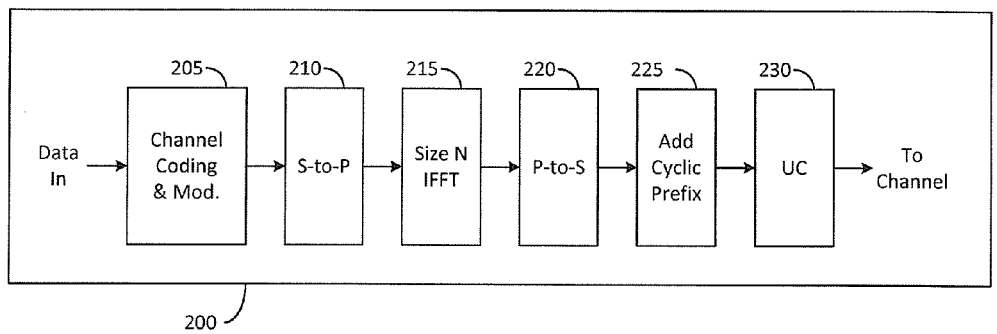
FIGS. 2A and 2B illustrate example wireless transmit and receive paths according to this disclosure.
Figure 2B:
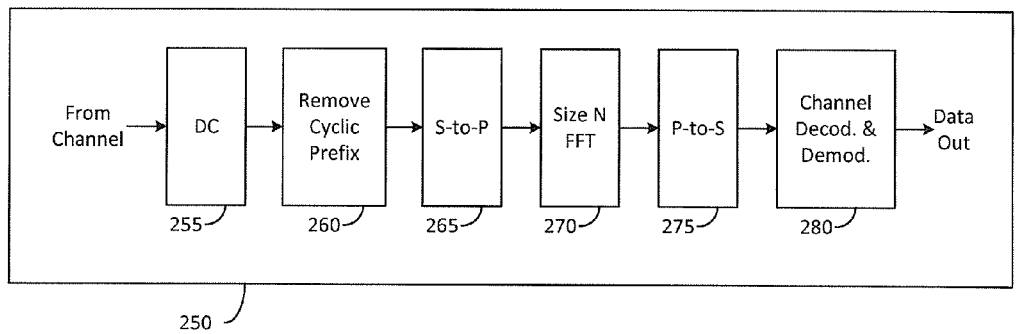

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are embodied within a UE that is configured to implement methods of Enhanced Hotspot 2.0 Management Object for Trusted Non-3GPP Access Discovery.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
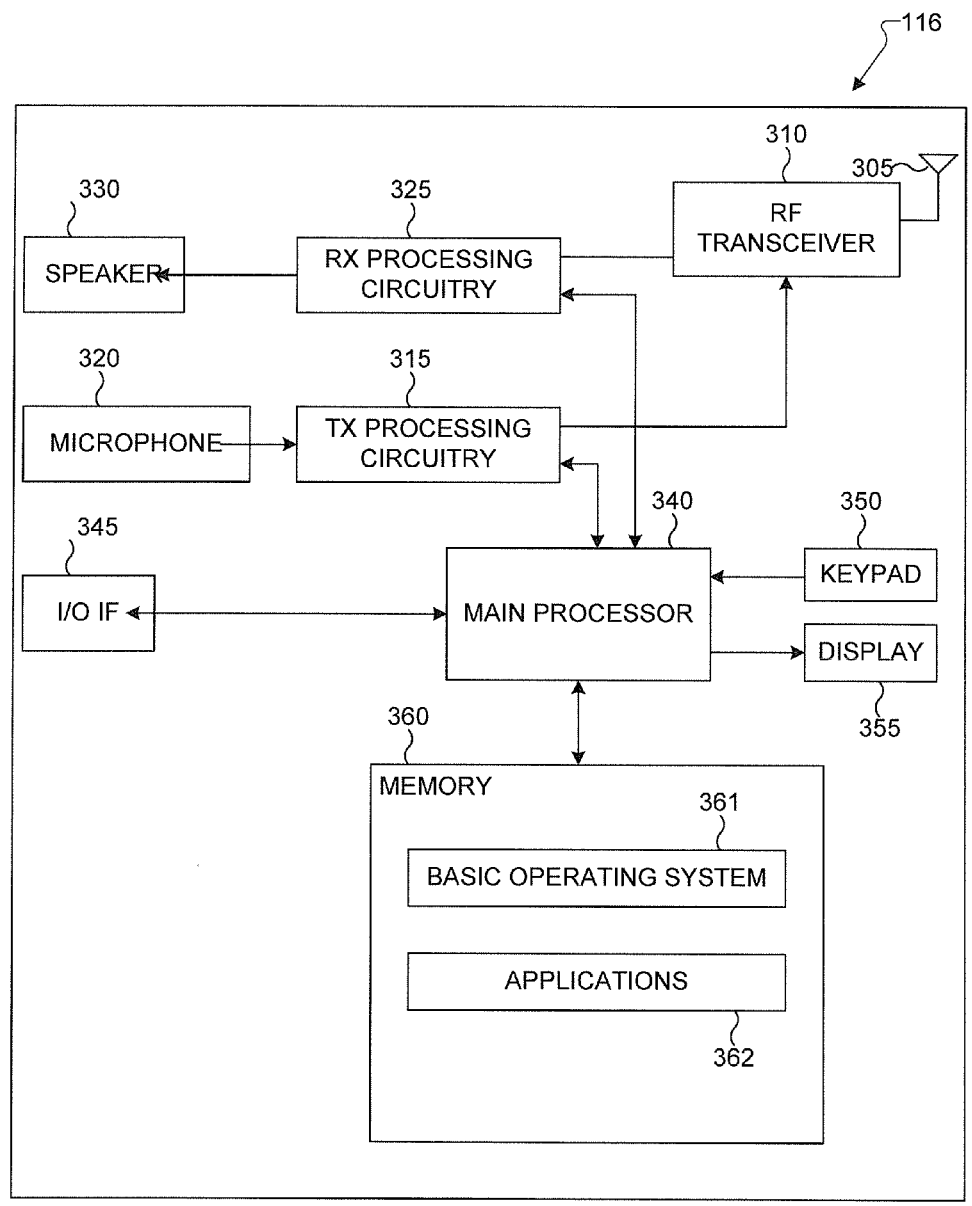
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. For example, the UE 116 is not required to include cellular communication capabilities, such as LTE. In certain embodiments, the UE 116 can be a WiFi only device, yet in other embodiments, the UE 116 can be a WiFi and LTE device.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for implementing methods of Enhanced Hotspot 2.0 Management Object for Trusted Non-3GPP Access Discovery. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
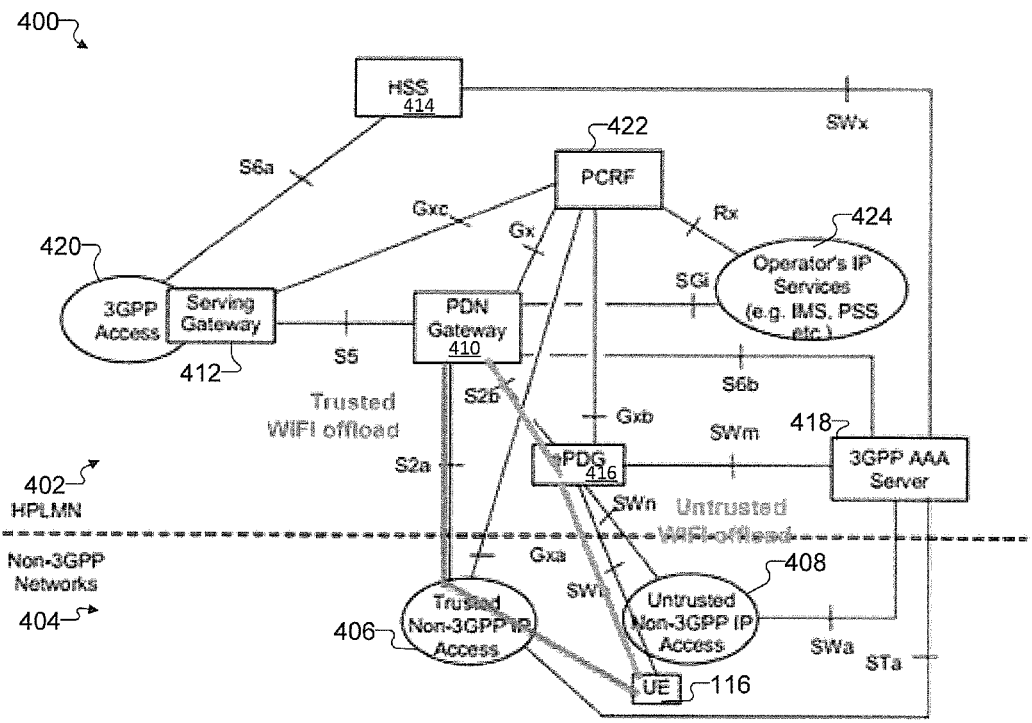
FIGS. 4A and 4B illustrate architecture of trusted and untrusted Wi-Fi offload according to this disclosure.
Figure 4B:
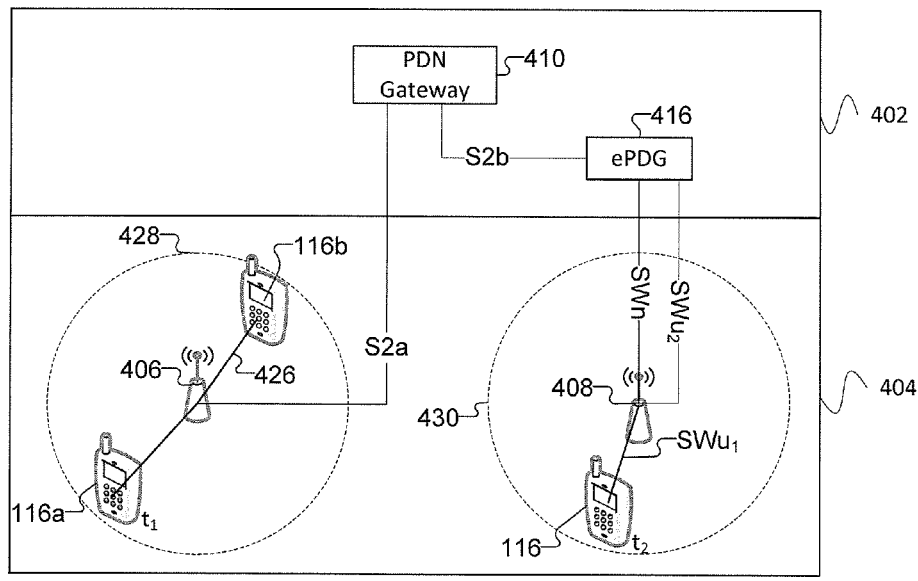

FIGS. 4A and 4B illustrate architecture 400 of trusted and untrusted Wi-Fi offload according to embodiments of the present disclosure. The embodiment of the architecture 400 shown in FIGS. 4A and 4B is for illustration only. Other embodiments could be used without departing from the scope of the present disclosure.

As shown in FIG. 4A, the architecture 400 of trusted and untrusted Wi-Fi offload includes a Home Public Land Mobile Network (HPLMN) 402 and non-3GPP networks 404. The non-3GPP networks 404 include one or more trusted non-3GPP internet protocol (IP) access points 406 (for example, a WiFi access point), which, together with the HPLMN 402, forms architecture of a trusted Wi-Fi offload. The non-3GPP networks 404 include one or more untrusted non-3GPP internet protocol (IP) access points 408, which, together with the HPLMN 402, form architecture of an untrusted Wi-Fi offload. The HPLMN 402 includes and Evolve Packet Core (EPC), which includes a Packet Data Network (PDN) gateway (GW) 410, a Serving Gateway 412, and a Home Subscriber Server (HSS) 414. Other network nodes of the HPLMN 402 include an Evolved Packet Data Gateway (ePDG) 416, a 3GPP authentication, authorization, and accounting (AAA) server 418, the 3GPP Access 420, a Policy and Charging Rules Function (PCRF) 422, and a group of Operator IP Services 424. The group of Operator IP Services 424 includes services such as Internet Protocol multimedia subsystem (IMS), packet-switched streaming Service (PSS), and the like.

The HPLMN 402 connects to the non-3GPP networks 404 through various connections or interfaces. More particularly, the trusted access point (AP) 406 directly (e.g., without any intermediate network nodes) connects to the PDN GW 410 through the S2a interface, connects to the AAA server 418 through the STa interface, and connects to the PCRF 422 through the Gxa interface. The untrusted access point 408 connects to the ePDG 416 through the SWn interface, and connects to the AAA server 418 through the Swa interface.

Various network nodes within the HPLMN 402 are connected to each other through various connections or interfaces. More particularly, the PDN GW 410 is connected to the Serving Gateway 412 through the S5 interface, is connected to the PCRF 422 through the Gx interface, is connected to the Operator's IP Services 424 through the SGi interface, is connected to the AAA server 418 through the S6b interface, and is connected to the ePDG 416 through the S2b interface. The Serving Gateway 412 connects to the 3GPP Access 420 through an interface, and connects to the PCRF 422 through the Gxc interface. The HSS 414 connects to the 3GPP Access 420 through the S6a interface, and connects to the AAA server 418 through the SWx interface. The ePDG 416 connects the PCRF 422 through the Gxb interface, and connects with the AAA server 418 through the SWm interface. The PCRF 422 connects to the Operator's IP Services 424 through the Rx interface.

FIG. 4B illustrates a portion of the architecture 400 of trusted and untrusted Wi-Fi offload according to embodiments of the present disclosure. The 3GPP standard defines two different types of WiFi offload: trusted WLAN offload and untrusted WLAN offload. In a trusted WLAN access network, the communication between a UE 116 and the Evolve Packet Core (EPC) is secure. In an untrusted WLAN access network, the communication between the UE 116 and the EPC is not trusted to be secure.

A 3GPP operator (for example, SPRINT, VERIZON, AT&T, or T-MOBILE) decides whether a WLAN access is trusted or not. For example, a WiFi access point may be trusted for one UE from an operator A and untrusted for another UE from operator B. More particularly, in this example, operator A owns the WiFi access point 406 and the customer of operator A owns the first UE 116a, but the customer of operator B owns the second UE 116b. When the first UE 116a accesses operator A's WiFi access point 406, the first UE 116a can access operator A's EPC through a trusted connection S2a. However, when the second UE 116b accesses operator A's WiFi access point 406, the second UE 116b recognizes that the second UE 116b does not belong to a customer of operator A, and determines that the second UE's access (for example, association through the connection or interface 426) of operator A's WiFi access point 406 is untrusted. To do so, the second UE 116b receives a beacon signal (including SSID of access point 406) from operator A's WiFi access point 406; compares the SSID of access point 406 to the SSIDs in the MO 600 (described more particularly below with reference to FIG. 6) to find a match; and determines whether the access point 406 is trusted or not based on contents within a trust field associated with the matching SSID found in the MO 600.

When a UE 116 attaches an access point name (APN) in an untrusted WiFi access, the UE 116 needs to first discover an ePDG 416, establish an Internet Protocol security (IPsec) tunnel with the ePDG, and then can connect to the EPC PDN GW 410 over the ePDG IPsec tunnel. The IPsec tunnel includes both interfaces S2b and SWu, as such, the IPsec tunnel connects the UE 116 to the PDN GW 410 through the untrusted access point 408 and ePDG 416. The SWu interface is the logical interface between UE 116 and ePDG 416. For purposes of explanation, the SWu interface can be considered to include a sub-interface $SWu_1$ and a sub-interface $SWu_2$, wherein the UE 116 connects to the untrusted access point 408 through the sub-interface $SWu_1$, and wherein the untrusted access point 408 connects to the ePDG 416 through the sub-interface $SWu_2$. As an example, this circumstance can occur when the customer of operator B carries the second UE 116*b* into the coverage area 428 such that operator A's access point 406 can associate and communicate with the second UE 116*b* through the interface 426. It is to be understood that the access point 406 provides untrusted WiFi access between the second UE 116*b* and PDN GW 410 through the interface 426 in an analogous way that the untrusted access point 408 provides untrusted WiFi access between the UE 116 and PDN GW 410 through the interfaces SWu and S2b. That is, operator A's WiFi access point 406 can connect to operator B's EPC PDN GW gateway (not shown) through an untrusted WiFi offload connection interface with operator B's ePDG (not shown).

Depending on the 3GPP operator requirements, the UE 116 can either (i) be configured to dynamically select the ePDG server, or (ii) include a statically configured ePDG server address. In the case of a static configuration, the UE 116 can be hard-coded with an ePDG server fully qualified domain name (FQDN) (e.g., epdg.operatorB.com). In this way, the UE 116 will connect back to the hard-coded ePDG server (e.g., the OperatorB ePDG server) even if in a roaming network, for example, within a coverage area 430 of an access point 408 (e.g., OperatorC WIFI AP) of untrusted network. Accordingly, connecting to operator B's ePDG is an option for the UE 116. The UE 116 can implement various processes to connect with different ePDG servers, and this disclosure is not limited to the embodiment described herein.

On the other hand, when a UE 116*a* attaches to a trusted WiFi access point 406 associated with a trusted WiFi access of the HPLMN 402, the UE 116*a* can connect directly to the EPC PDN GW 410. That is, based the determination that the WiFi access point 406 is trusted, the UE 116*a* connects to EPC PDN GW 410 through a direct connection (namely, interface S2a) between the trusted WiFi access point 406 and the EPC PDN GW 410.

Figure 5:
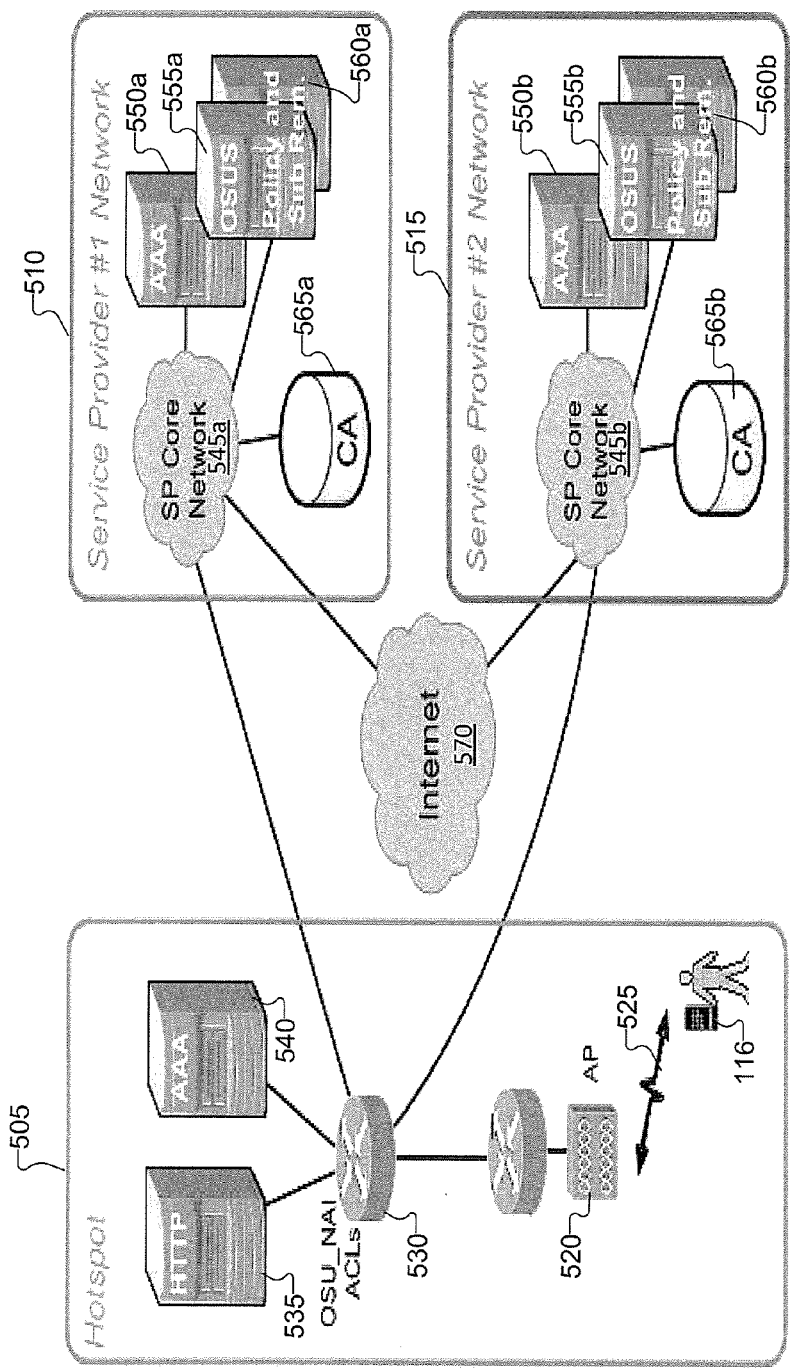
FIG. 5 illustrates an example WiFi access Hotspot 2.0 service architecture according to this disclosure.

FIG. 5 illustrates an example WiFi access Hotspot 2.0 service architecture 500 according to embodiments of the present disclosure. The embodiment of the architecture 500 shown in FIG. 5 is for illustration only. Other embodiments could be used without departing from the scope of the present disclosure.

The WiFi access Hotspot 2.0 service architecture 500 includes one or more hotspots 505 and multiple service provider networks 510, 515 (herein the terms "service provider" and "3GPP operator" are used interchangeably). The hotspot 505 includes an access point 520 and an online sign up (OSU) network access identifier (NAI) Access Control Lists (ACLs) database 530. The access point 520 connects to the OSU NAI ACLs database 530, such as through an intermediate database. The access point 520 associates with a UE 116 to form a connection 525. The access point 520 can represent the trusted access point 406 or the non-trusted access point 408, depending whether the access point 520 is trusted or not trusted by the 3GPP operator's EPC network 545*a*-545*b*. The OSU NAI ACLs database 530 connects to the HTTP server 535 and the AAA server 540. The hotspot 505 includes a Hyper Text Transfer Protocol (HTTP) server 535. The HTTP server 535 is configured to implement various communications (for example, registration, remediation, and terms and conditions data exchange) over HTTPS between the UE 116 and the hotspot operator and between the UE 116 and service provider (i.e., 3GPP operator) networks 510, 515. The hotspot 505 includes an AAA server 540, which is configured to act as an AAA proxy to relay messages to an AAA server of supported service provider networks 510, 515.

Each service provider network 510 or 515 includes at least one server, wherein each server includes process circuitry that contains at least one processing unit and that is configured to perform the functions of the server. The at least one processing unit could, for instance, include at least one processor, microprocessor, microcontroller, field programmable gate array (FPGA), application specific integrated circuit (ASIC), or other processing or control device. The at least one processing unit executes instructions that may be stored in a memory or non-transitory computer readable medium.

Figure 6:
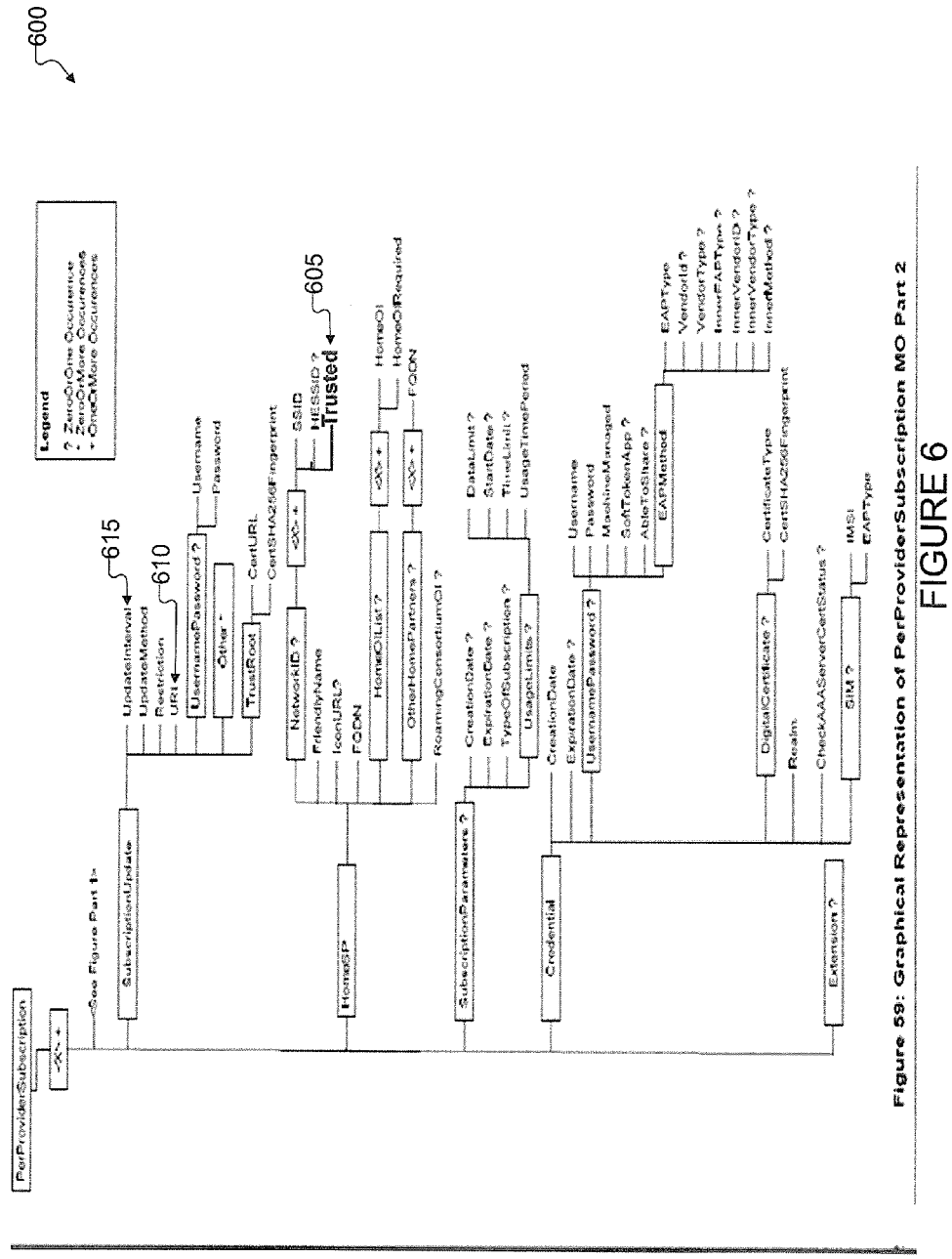
FIG. 6 illustrates an example Hotspot 2.0 Management Object (MO) according to this disclosure.

Each service provider network 510, 515 includes a service provider (SP) Core Network 545*a*-545*b* that is connected to the internet 570, an AAA server 550*a*-550*b*, an OSU server 555*a*-555*b*, a Policy Server, a Subscription Remediation (Sub Rem) Server, and a certificate authority (CA) database 565*a*-565*b*. In certain embodiments, the service provider network 510, 515 includes a Policy and Sub Rem Server 560*a*-560*b* (herein generally referred to as Sub Rem server 560) in place of the separate Policy Server and separate Sub Rem server. The OSU server 555*a*, 555*b* implements an OSU process with the UE 116. The AAA server 550*a*, 550*b* authenticates the UE credentials and grants Internet access to the UE when the UE credentials are valid. The Policy server provides policies to the UE 116 for a Hotspot Discovery and Selection process. The Sub Rem server provides subscription parameters to the UE 116 through a Management Object (MO) (described below with reference to FIG. 6). That is, the Sub Rem server 560 generates an MO and provides the MO to the UE. The Sub Rem server 560 includes a database of all trusted access points, along with identification and credential information related to each trusted access point, which can be stored in a tree map as shown in FIG. 6. In certain embodiments, the Sub Rem server 560 database further includes untrusted WiFi access point information. Each service provider network 510 can connect to the hotspot 505 via the SP core network 545*a*, 545*b*, for example by connecting to the OSU NAI ACLs database 530.

Note that the AAA server 550*a*-550*b* in FIG. 5 could be the same as or similar to corresponding AAA server 418 in FIG. 4. These components in FIG. 5 can operate in the same or similar manner as the corresponding components in FIG. 4. Also note that features of the trusted and untrusted Wi-Fi offload architecture 400 could be used in the WiFi access Hotspot 2.0 service architecture 500. For instance, the WiFi access Hotspot 2.0 service architecture 500 could include PDN GW 410 in the SP Core network 545*a*, 545*b* of the architecture 500. As another example, the trusted and untrusted Wi-Fi offload architecture 400 could include the Sub Rem server 560 shown in FIG. 5.

FIG. 6 illustrates an example Hotspot 2.0 Management Object (MO) 600 according to embodiments of the present disclosure. The embodiment of the MO 600 shown in FIG. 6 is for illustration only. Other embodiments could be used without departing from the scope of the present disclosure.

The 3GPP operator can deliver the MO 600 to the UE 116 for Wi-Fi access network selection; and to do so, the Sub Rem server 560 generates and provisions the MO 600 to the UE 116 for informing the UE 116 of WiFi subscription information to be stored in a trusted WLAN access list of the UE 116. When no MO 600 is available in the UE 116, the service provider network 510, 515 sends a whole MO 600 to the UE 116. From time-to-time, the UE 116 subscription or MO 600 may be in need of remediation. The service provider network 510, 515 determines when to remediate the MO 600 and pushes new WiFi subscription information into the UE 116; and to do so, the Sub Rem server 560 generates and provisions the MO 600 to the UE 116 for dynamically updating the trusted WLAN access list stored in the UE 116.

The UE 116, uses the provisioned MO 600 to select and authenticate a WiFi network in accordance with the identifiers (e.g., SSID), credentials, and related metadata contained in the MO 600. The WiFi subscription information within the MO 600 enables the UE 116 to receive the trusted properties (e.g., credentials) for the WiFi APs provided by the 3GPP operator. Given that the MO 600 supports both UE and NW initiated updates, the UE 116 receives the latest trusted WLAN access list via the MO 600.

The MO 600 includes a PerProviderSubscription MO that contains a trust field 605 in accordance with this disclosure. The trust field 605 defines whether a WiFi AP is trusted or not. For example, the trust field 605 can contain a bit having a bit value of '1' representing a trusted relationship between the access point 406 and the EPC of the HPLMN 402. The trust field 605 can contain a bit value of '0' representing a non-trusted relationship between the access point 408 and the EPC of the HPLMN 402. As another example, the trust field 605 can contain a string containing "Trusted" corresponding to the trusted IP access between the UE 116 and access point 406, but containing "Untrusted" corresponding to the non-trusted IP access between the UE 116 and access point 408.

REF3 defines a PerProviderSubscription Management Object (referred to as "Standard PPS MO") (not shown). Certain contents of the Standard PPS MO can be found in the MO 600 as well, for example, the MO 600 can include a list of supported WiFi APs, wherein the list includes the SSID name and corresponding credentials (i.e., user names/passwords pairs, and the like). However, as described below, the MO 600 in accordance with this disclosure provides technical advantages that are not found in the Standard PPS MO. The MO 600 contains WiFi subscription and policy specific parameters supporting Service Provider (SP) subscriptions.

The MO 600 is Open Mobile Alliance Device Management (OMA-DM) compliant. The MO 600 supports a UE initiated initial provisioning of the MO 600, as well as both UE and network initiated WiFi subscription information update, which are processes described more particularly below with reference to FIGS. 7 and 8.

Other features of the MO include a URI field 610 that stores a subscription server address and an Update Interval field 615 (also referred to as a Subscription Update Interval) that contains a parameter defining a frequency of initiating provisioning an update to the whole MO. The UE 116 keeps a timer which keeps track of the time since the last subscription update. When the time since the last subscription update approaches, reaches, or passes the parameter value of the Update Interval field 615, the UE 116 attempts to contact the Sub Rem server 560 at the address stored in the URI field 610 for an update.

Figure 7:
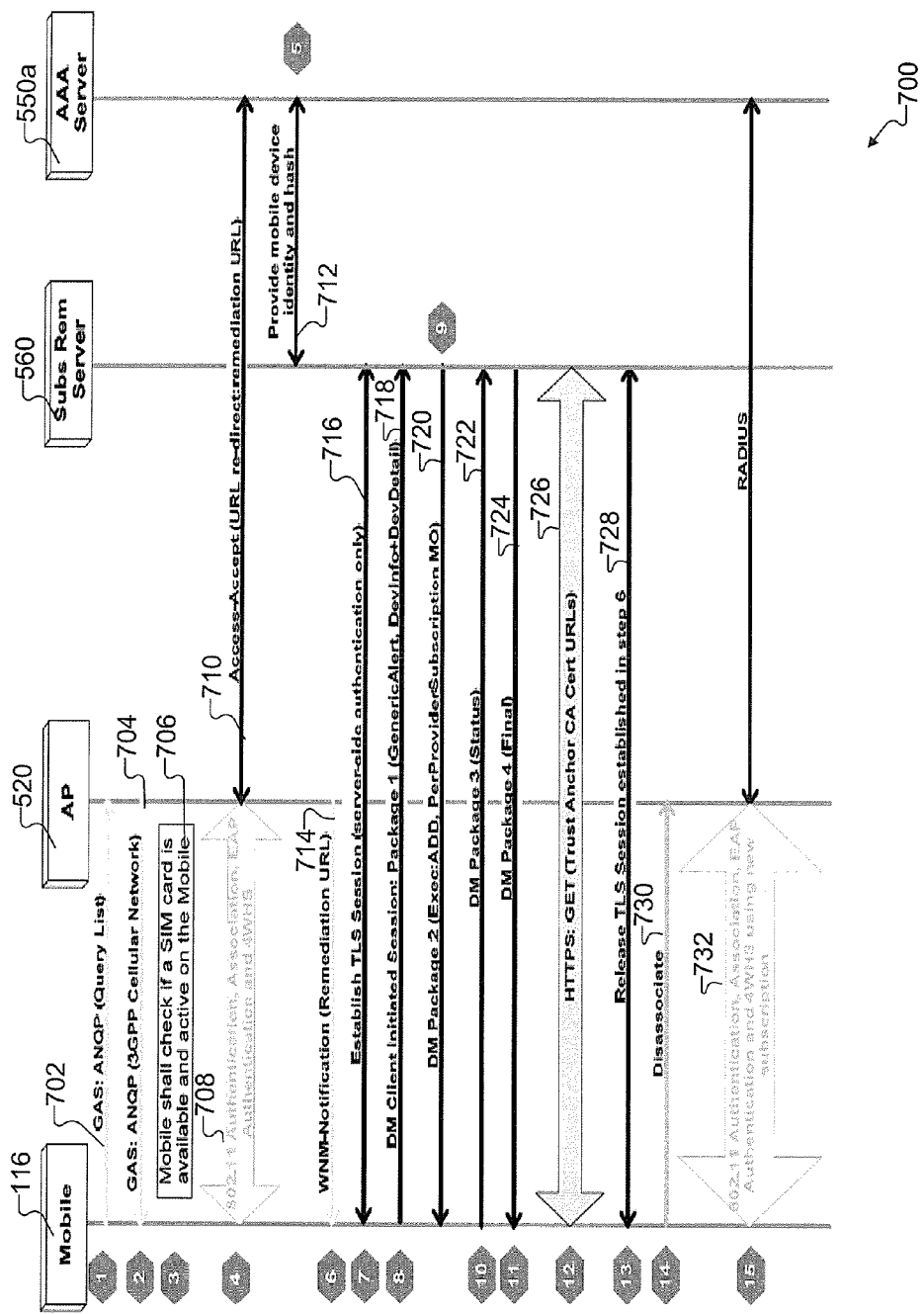
FIG. 7 illustrates a MO initial provisioning according to this disclosure.

FIG. 7 illustrates a MO initial provisioning process 700 for a mobile device with a SIM card according to embodiments of the present disclosure. The embodiment of the MO initial provisioning process 700 shown in FIG. 7 is for illustration only. Other embodiments could be used without departing from the scope of this disclosure. The process 700 can include provisioning initial subscription metadata and policy for the MO 600 using OMA-DM, wherein the service provider network triggers a remediation process to deliver the MO 600 to the UE 116. For ease of explanation, the network 510 of service provider #1 implements the process 700.

The process 700 begins at operation 702, wherein the UE 116 scans for Wi-Fi Networks by transmitting a query list to the access point 520 in a request according to Generic Advertisement Service (GAS) with Access Network Query Protocol (ANQP). The query list includes a 3GPP Cellular Network ANQP element and NAI realm list element, and the like.

In operation 704, the access point 520 transmits a response to the UE 116 according to the GAS ANQP, wherein the contents of the response depend upon the query list of the UE. The contents of the response can include: service provider's cellular information (e.g., network code and country codes), a list of NAI realm, and a list of one or more EAP methods (e.g. EAP-SIM, EAP-AKA, EAP-TTLS, or EAP_TLS) optionally included for NAI realm to use for authentication.

In operation 706, when the ANQP query response 704 indicates that the service provider's network supports SIM based authentication (e.g. EAP-SIM or EAP_AKA), the UE 116 determines whether a SIM card is available and active on the UE 116.

In operation 708, if a SIM card is available and active, the Hotspot Operator is the mobile device's Home Service Provider and the network supports SIM based authentication, and the mobile device 116 associates to the Wi-Fi AP 520. The UE 116 and access point 520 perform an 802.11 authentication, association, EAP authentication, and Four-Way Hand Shake (4WHS), wherein the UE 116 does not have any MO.

In operation 710, when a service provider determines that subscription provisioning is needed, at the end of the EAP authentication sequence, the service provider's AAA Server 550a sends an "Access-Accept" with a remediation redirect URL to the Authenticator (i.e., the access point 520). In operation 712, the AAA server 550a provides the tuple {hotspot2dot0-mobile-identifier-hash, Mobile device's IMSI, Mobile device's MSISDN} to the Subscription Remediation Server 560.

In operation 714, the access point 520 transmits a WNM-notification to the UE 116. The WNM-notification includes a remediation URL received from the AAA server 550a.

In operation 716, the UE 116 and Sub Rem server 560 establish a TLS session.

In operation 718, the UE 116 establishes a DM client initiated session for Package 1, by transmitting a generic alert, DevInfo and DevDetail messages to the Sub Rem server 560. The Reason element in the Generic Alert indicates that the user of the mobile device is attempting to initiate an initial provisioning of subscription metadata or policy.

In operation 720, the Sub Rem server 560 transmits, by pushing a DM Package 2 to the UE 116. The DM Package 2 includes an Exec:ADD and the whole MO 600. That is, in operation 720, the Sub Rem server 560 generates an MO 600 including trusted WIFI AP information and performs an initial provisioning of the whole MO 600.

In operation 722, the UE 116 sends a DM Package 3 to the Sub Rem server 560 indicating the status of the previous operation. In operation 724, the Sub Rem server 560 transmits a DM Package 4 (including final information) to the UE 116, indicating the end of the OMA-DM session. In operation 726, the UE 116 uses HTTPS to retrieve the Trust Anchor CA certificates from the Sub Rem server 560.

In operation 728, the UE 116 and Sub Rem server 560 release the TLS session that was previously established (for example as established in operation 716). In operation 730, the UE 116 transmits a disassociate message to the access point 520. In operation 732, if the subscription was established successfully in operation 716, the UE 116 and access point 520 perform an 802.11 authentication, association, EAP authentication, and 4-Way Hand Shake using the new initial MO 600 provisioned in the DM Package 2.

Figure 8:
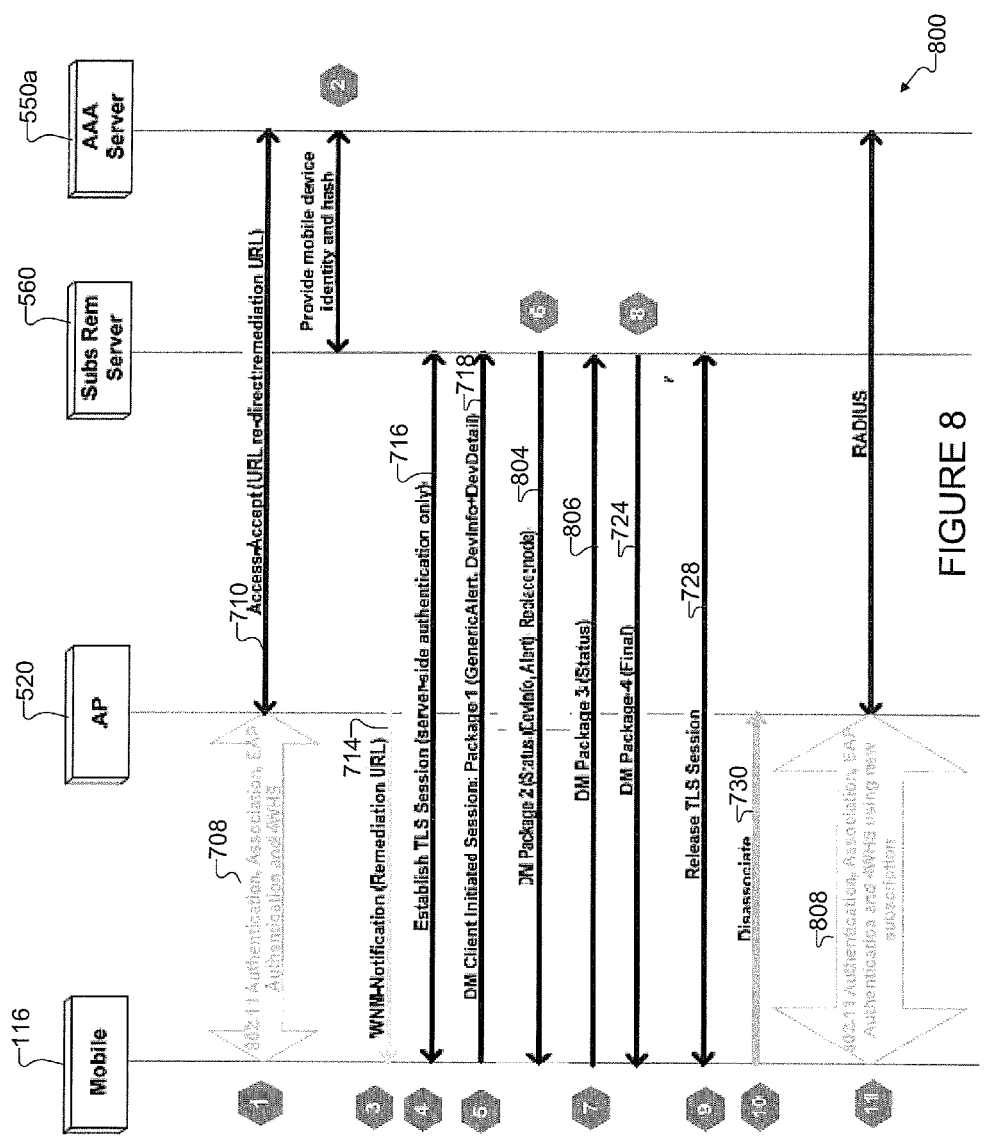
FIG. 8 illustrates a process of a network initiated subscription update according to this disclosure.

FIG. 8 illustrates a process 800 of a network initiated subscription update for a UE with a SIM card according to this disclosure. The embodiment of the network initiated subscription update process 800 shown in FIG. 8 is for illustration only. Other embodiments could be used without departing from the scope of this disclosure. The process 800 can include provisioning updated subscription metadata and policy for the MO 600 using OMA-DM, wherein the service provider network triggers a remediation process to deliver to the UE 116 either (i) a whole MO that is updated or (ii) a field update to a parameter of the MO 600. For ease of explanation, the network 510 of service provider #1 implements the process 800.

Note that certain operations of the process 700 can be repeated as part of the process 800. Accordingly, the details of operations repeated from the process 700 will not be reiterated in reference to FIG. 8.

The process 800 begins at operation 708, which is followed by operation 710. The UE 116 already has an MO 600 stored prior to the implementing operation 708. From operation 710, the process 800 proceeds to operation 714, 716, 718, and 804, consecutively.

In operation 804, the Sub Rem server 560 transmits, by pushing a DM Package 2 to the UE 116. The DM Package 2 includes a status information (i.e., DevInfo and Alert information), a replace command specifying the treemap node or field of the MO 600 to be updated. In certain embodiments, such as when the Sub Rem server 560 initiates an update of the whole MO, the replace command can specify each field of the MO 600. In response to receiving field update information in the DM Package 2, the UE 116 replaces the previously stored parameter at the specified node/field of the MO with the newly received field update information. That is, in operation 804, the Sub Rem server 560 performs a provisioning of an update of the MO 600. The process 800 proceeds to operation 806.

In operation 806, the UE 116 transmits a DM Package 3 to the Sub Rem server 560. The DM Package 3 includes status information, such as an acknowledgement 200 OK indicating that at least a portion of the MO 600 stored in the UE 116 has been updated according to the received DM Package 2. An update of "at least a portion of the MO" can be either an update of the whole MO 600 or an update of less than all of the MO 600 (referred to as a "partial update"). The process 800 proceeds to operations 724, 728, and 730, consecutively. In operation 808, the UE 116 and access point 520 perform an 802.11 authentication, association, EAP authentication, and 4-Way Hand Shake using the updated MO 600 provisioned in the DM Package 2 at operation 804. The operation 808 can be the same as or similar to operation 732 of FIG. 7.

Figure 9:
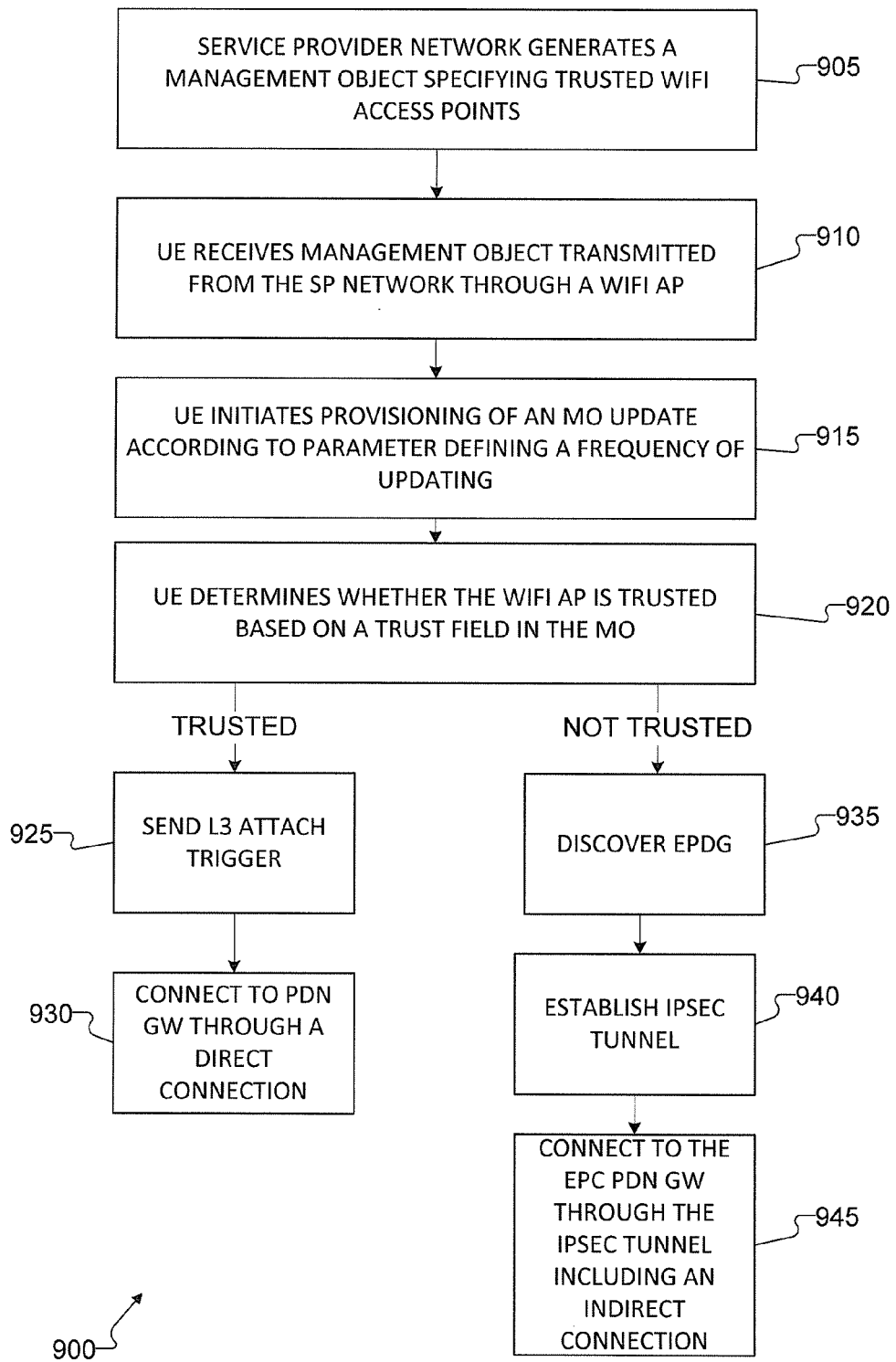
FIG. 9 illustrates a method of discovering a trust relationship of the non-3GPP access network according to this disclosure.

FIG. 9 illustrates a method of discovering a trust relationship of the non-3GPP access network 510 according to embodiments of the present disclosure. The embodiment of the process 900 shown in FIG. 9 is for illustration only. Other embodiments could be used without departing from the scope of this disclosure.

During initial attach or handover attach, a UE 116 needs to discover the trust relationship (whether the AP 520 is a Trusted or Untrusted) of the non-3GPP access network 510 in order to know which non-3GPP IP access procedure to initiate. For untrusted access, the UE 116 needs to set up an IPsec tunnel with the ePDG. For trusted access, the UE 116 needs to send a L3 attach trigger.

In block 905, the Sub Rem server 560 of the service provider network 510 generates a management object 600 specifying trusted WiFi access points.

In block 910, the UE 116 receives the MO 600 transmitted from the SP Network 510 through the WiFi access point 520.

In block 915, the UE 116 initiates provisioning of an MO update according to parameter defining a frequency of updating. More particularly, the UE 116 receives a field update pushed from the Sub Rem server 560. The pushed field update comprises an update to a parameter (i.e., Update Interval field 615 parameter) that defines a frequency of initiating provisioning of the update of the whole MO 600. In response to receiving the pushed field update, the UE 116 changes the frequency of initiating provisioning by replacing the old Update Interval field 615 parameter with the newly received value contained in the pushed field update. The UE 116 initiates a subsequent provisioning of the update MO subscription (i.e., whole MO) according to the changed frequency, such as by attempts to contact the Sub Rem server 560 for an update.

In block 920, the UE 116 determines whether the WiFi AP 520 is trusted based on the trust field 605 in the MO 600. In response to determining that the WiFi access point is trusted, the UE sends an L3 attach trigger (block 925), and then connects to the EPC PDN GW through a direct connection (block 930). Note that in block 930, communications between the UE 116 and EPC PDN GW are trusted and thus not required to be encrypted. In response to determining that the WiFi access point 520 is not trusted, the UE 116 discovers a Evolved Packet Data Gateway (ePDG) (block 935), then establishes an Internet Protocol security (IPsec) tunnel that connects the untrusted WiFi access point to the discovered ePDG (block 940), and then connects to the EPC PDN GW through the IPsec tunnel that connects the untrusted WiFi access point to an Evolved Packet Data Gateway (ePDG) and connects the EPC PDN GW to the ePDG (block 945). Note that in block 945, the UE 116 and ePDG share an encryption/decryption secret for communications through the IPsec tunnel, which are encrypted because the WiFi access point is untrusted.

The embodiments of this disclosure provide an effective way for discovering (with specificity) whether a WLAN access is trusted or not. The embodiments of this disclosure enhance HS 2.0 MO (PerProviderSubscription MO) to support trusted WiFi discovery. The MO 600 of this disclosure HS 2.0 MO supports periodic or on-demand updates from the SP network via OMA-DM, and hence supports dynamic updates of trusted WiFi access info. The MO 600 allows the UE 116 to discover whether a WiFi AP 520 is trusted or not via a HS 2.0 PerProviderSubscription type MO 600 that includes a trust field for each trusted AP. There is no need to set up an extra ePDG tunnel to discover the trusted relationship information, thereby saving power and time.

There are other possible approaches for UE to detect the trust relationship of the non-3GPP access network. Each of these other approaches has its own disadvantages.

The UE operates on the basis of a pre-configured policy that is an operator specific implementation. For example, a VERIZON user equipment will recognize the WiFi AP with the SSID prefix of "vzwwifi" as trusted WiFi access. However, new non-3GPP access networks may join continually and thus the pre-configured policy must be kept up to date. As a disadvantage, there is no effective way for network operators to auto update the pre-configured trusted WLAN list.

REF1 provides another possible approach: if the WiFi access supports 3GPP-based access authentication, the UE discovers the trust relationship during the 3GPP-based access authentication. If the UE performs EAP-AKA or EAP-AKA' authentication, the 3GPP AAA server may send a trust relationship indicator of the non-3GPP access network to the UE during the authentication. The indicator is sent using an AT_TRUST_IND attribute, by extending the EAP-AKA (and EAP-AKA') protocol as specified in sub-clause 8.2 of IETF RFC 4187. As a disadvantage, this solution requires the AP and other infrastructure to support EAP-AKA or EAP-AKA'. Many traditional APs do not support EAP-AKA or EAP-AKA' and cannot use this approach.

REF2 sets up a security tunnel to the ePDG and then use the IP assignment information to verify whether the WLAN access is trusted or not. This approach is not efficient at least due to the extra cost of setting up security tunnel to ePDG.

One other possible approach involves the following circumstance: The UE tries to establish a connection to the PDN GW via trusted access approach (namely, by sending an L3 attach triggering). If the establishment to the PDN GW fails (because the PDN GW is not reachable from the untrusted non-3GPP access), the UE concludes that the AP is in an untrusted non-3GPP access and that the ePDG must be used. The problem is that PDN GW connection failure can be caused by various factors, such as the PDN GW being unreachable, router failure on the path of UE and PDN GW, and the like. The UE cannot conclude accurately that an AP offers non-trusted WiFi access based on attach failure caused by PDN connection failure.

One other possible approach involves the following circumstance: The UE always uses the ePDG first, namely by first establishing the Ipsec tunnel to an ePDG. If the non-3GPP access is trusted, the UE is informed to connect to the PDN GW directly. The disadvantages for this approach is that it consumes higher or extra resources, which is not efficient.

One other possible approach involves the following circumstance: The UE may ask a DHCP server if a WiFi access is trusted or not. The UE first connects to the non-3GPP access, and then requests a DHCP server about the trust relationship (including its identity in form of a NAI, and/or also the user's home operator identifier). The DHCP server informs the UE about the trust relationship. The disadvantage for this approach is that it requires a pre-configured entry in the local DHCP server or support by the AAA infrastructure, which is usually not supported. Hence this approach has limited applicability.

One other possible approach involves the following circumstance: the UE may ask a DNS (Domain Name Server) server if it is in a trusted or untrusted WiFi access. The UE connects to the non-3GPP access and then construct a Fully Qualified Domain Name (FQDN) with non-3GPP network info and/or an identifier info of the user. The UE asks the DNS system about this specific FQDN, and the DNS request will be resolved recursively. If the non-3GPP access is untrusted, the DNS server will provide an ePDG together with an IP address. If the non-3GPP access is trusted, the DNS server will provide a PDN GW together with an IP address. The disadvantages here are that most of DNS servers do not support this.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
a transceiver configured to transmit information to and receive information from a Wireless Fidelity (WiFi) access point;
processing circuitry coupled to the transceiver and configured to:
determine a service provider associated with the WiFi access point based on a response to an Access Network Query Protocol (ANQP) query,
receive at least a portion of a management object (MO), the MO including a trust field specifying whether the WiFi access point is trusted for WiFi offload by the service provider;
in response to determining that the WiFi access point is trusted, send an L3 attach trigger; and
in response to determining that the WiFi access point is not trusted, establish an Internet Protocol security (IPsec) tunnel that connects the apparatus to an Evolved Packet Data Gateway (ePDG) through the untrusted WiFi access point.

2. The apparatus of claim 1, further configured to: based the determination that the WiFi access point is trusted, connect to an Evolve Packet Core (EPC) Packet Data Network (PDN) Gateway (GW) through a direct connection between the trusted WiFi access point and the EPC PDN GW.

3. The apparatus of claim 2, further configured to, in response to determining that the WiFi access point is not trusted:
discover the ePDG,
establish the IPsec tunnel with the ePDG, and
connect to the EPC PDN GW through the IPsec tunnel that connects the untrusted WiFi access point to the ePDG and connects the EPC PDN GW to the ePDG.

4. The apparatus of claim 1, wherein the at least the portion of the MO comprises an initial provisioning of a whole of the MO.

5. The apparatus of claim 1, wherein:
the at least the portion of the MO comprises a whole of the MO; and
the apparatus is further configured to initiate provisioning of an update of the whole MO.

6. The apparatus of claim 1, wherein:
the at least the portion of the MO comprises a whole of the MO; and
the apparatus is further configured to receive a pushed update of the whole MO.

7. The apparatus of claim 1, wherein:
the at least the portion of the MO comprises a pushed field update to a parameter that defines a frequency of initiating provisioning of an update of a whole of the MO;
the apparatus is further configured to in response to receiving the pushed field update, change the frequency of initiating provisioning of the update of the whole MO; and
initiate a subsequent provisioning of the update of the whole MO according to the changed frequency.

8. An apparatus comprising:
an input/output terminal configured to output information to and receive information from a user equipment (UE) through a Wireless Fidelity (WiFi) access point;
processing circuitry coupled to the input/output terminal and configured to:
 in response to a receiving a request to an Access Network Query Protocol (ANQP) query, output a response indicating a service provider associated with the WiFi access point;
 generate and provision to the UE at least a portion of a management object (MO), the MO including a trust field specifying whether the WiFi access point is trusted for WiFi offload by the service provider.

9. The apparatus of claim 8, wherein:
the at least the portion of the MO comprises a whole of the MO; and
the apparatus is further configure to initiate an initial provisioning of the whole MO to the UE.

10. The apparatus of claim 8, wherein:
the at least the portion of the MO comprises a whole of the MO; and
the apparatus is further configure to initiate provisioning of an update of the whole MO to the UE.

11. The apparatus of claim 8, wherein:
the at least the portion of the MO comprises a whole of the MO; and
the apparatus is further configured to push an update of the whole MO to the UE.

12. The apparatus of claim 8, wherein:
the at least the portion of the MO comprises a field update to a parameter that defines a frequency of initiating provisioning of an update of a whole of the MO;
the apparatus is further configured to change the frequency of initiating provisioning, and push the field update to the UE; and
subsequently provision the update of the whole MO according to the changed frequency.

13. A method comprising:
receiving information from a Wireless Fidelity (WiFi) access point;
determining, by processing circuitry, a service provider associated with the WiFi access point based on a response to an Access Network Query Protocol (ANQP) query;
receiving at least a portion of a management object (MO), the MO including a trust field specifying whether the WiFi access point is trusted for WiFi offload by the service provider;
in response to determining that the WiFi access point is trusted, sending an L3 attach trigger; and
in response to determining that the WiFi access point is not trusted, establishing an Internet Protocol security (IPsec) tunnel that connects a user equipment to an Evolved Packet Data Gateway (ePDG) through the untrusted WiFi access point.

14. The method of claim 13, further comprising: based the determination that the WiFi access point is trusted, connecting to an Evolve Packet Core (EPC) Packet Data Network (PDN) Gateway (GW) through a direct connection between the trusted WiFi access point and the EPC PDN GW.

15. The method of claim 14, further comprising, in response to determining that the WiFi access point is not trusted:
discovering the ePDG,
establishing the IPsec tunnel with the ePDG, and
connecting to the EPC PDN GW through the IPsec tunnel that connects the untrusted WiFi access point to the ePDG and connects the EPC PDN GW to the ePDG.

16. The method of claim 13, wherein the at least the portion of the MO comprises an initial provisioning of a whole of the MO.

17. The method of claim 13, wherein:
the at least the portion of the MO comprises a whole of the MO; and
the method further comprises initiating a provisioning of an update of the whole MO.

18. The method of claim 13, wherein:
the at least the portion of the MO comprises a whole of the MO; and
the method further comprises receiving a pushed update of the whole MO.

19. The method of claim 13, wherein:
the at least the portion of the MO comprises a pushed field update to a parameter that defines a frequency of initiating provisioning of an update of a whole of the MO;
the method further comprising: to in response to receiving the pushed field update, changing the frequency of initiating provisioning of the update of the whole MO; and
initiating a subsequent provisioning of the update of the whole MO according to the changed frequency.

* * * * *